(12) United States Patent
Alexander, Sr. et al.

(10) Patent No.: US 10,261,241 B2
(45) Date of Patent: Apr. 16, 2019

(54) ILLUMINATED WINDOW DISPLAYING LETTERS AND NUMBERS

(76) Inventors: Jerry Alexander, Sr., Memphis, TN (US); Jerry Dewayne Alexander, Jr., Memphis, TN (US)

(*) Notice: Subject to any disclaimer, the term of this patent is extended or adjusted under 35 U.S.C. 154(b) by 0 days.

(21) Appl. No.: 10/068,095

(22) Filed: Feb. 3, 2002

(65) Prior Publication Data
US 2002/0136026 A1   Sep. 26, 2002

Related U.S. Application Data

(60) Provisional application No. 60/269,106, filed on Feb. 15, 2001.

(51) Int. Cl.
*F21V 8/00* (2006.01)
*G09F 13/00* (2006.01)
*G09F 13/04* (2006.01)

(52) U.S. Cl.
CPC ........... *G02B 6/0095* (2013.01); *G09F 13/00* (2013.01); *G09F 13/04* (2013.01)

(58) Field of Classification Search
CPC ........ F21W 2131/405; F21W 2121/004; A47F 3/001; A47F 11/10; A47G 19/2227; F21Y 2101/02; F21Y 33/006; F21K 9/00; F21K 2/06; F21S 4/003; G02B 6/0095
USPC ......... 362/125, 26, 27, 31, 34, 84, 145, 555, 362/559, 561, 812; 40/546, 547, 541, 40/544; 385/901; 313/513
See application file for complete search history.

(56) References Cited

U.S. PATENT DOCUMENTS

| | | | | |
|---|---|---|---|---|
| 1,782,328 A | * | 11/1930 | Wearham | G09F 13/24 359/228 |
| 1,803,706 A | * | 5/1931 | Hotchner | G09F 13/26 40/545 |
| 3,127,535 A | * | 3/1964 | Westerheim | G09F 9/46 313/521 |
| 3,596,095 A | * | 7/1971 | Leach | 250/461.1 |
| 3,621,332 A | * | 11/1971 | Janning | G09F 9/46 315/313 |
| 3,984,923 A | * | 10/1976 | Rawson | G09B 7/08 434/316 |
| 4,318,330 A | * | 3/1982 | Hausenblas | F41G 3/165 89/41.05 |
| 4,320,324 A | * | 3/1982 | Ariga | H01J 61/30 313/318.01 |
| 4,645,970 A | * | 2/1987 | Murphy | B32B 17/10036 313/509 |
| 4,887,003 A | * | 12/1989 | Parker | G09F 13/22 313/634 |
| 5,126,632 A | * | 6/1992 | Parker | G09F 13/22 313/516 |
| 5,198,723 A | * | 3/1993 | Parker | G09F 13/22 313/493 |
| 5,339,550 A | * | 8/1994 | Hoffman | B60Q 1/503 362/497 |
| 5,684,973 A | * | 11/1997 | Sullivan | G06F 12/0607 365/189.02 |
| 5,911,613 A | * | 6/1999 | Byrum | H01J 9/261 445/26 |

(Continued)

*Primary Examiner* — Alexander K Garlen

(57) ABSTRACT

An illuminated window having an illuminate film, controller device, and wiring connection in between two pieces of glass forming the window. The window displays at least one of illuminated letters and numbers in order to provide information to a viewer.

3 Claims, 8 Drawing Sheets

(56) References Cited

U.S. PATENT DOCUMENTS

| | | | | |
|---|---|---|---|---|
| 6,124,783 | A | * | 9/2000 | Alexander .............. 340/426.12 |
| 6,163,247 | A | * | 12/2000 | O'Meara .................. B64F 1/18 |
| | | | | 340/321 |
| 6,222,460 | B1 | * | 4/2001 | DeLine ................. B60K 35/00 |
| | | | | 248/549 |
| 2002/0165310 | A1 | * | 11/2002 | Zhou et al. .................. 524/500 |

* cited by examiner

ILLUMINATED WINDOW DISPLAYING LETTERS AND NUMBERS

This applicant claim benefit of provisional applicant No. 60/269,106 and filing date Feb. 15, 2001.

FIELD OF THE INVENTION

This invention is directed to visible display devices, in particular signage such as neon gas tubing or any other type of signs. Many businesses, homes and advertisements utilize illuminated letters and numbers to publicize their business message, name, etc.

BACKGROUND OF THE INVENTION

Many businesses and advertisements publicize their message through neon gas tubing or papers. This would be an improved device for displaying such messages permanently, because illuminate film can display any number of different phrases which are then illuminated from within the window of the present invention.

SUMMARY OF THE INVENTION

This new display device is made of an illuminate film installed between two pieces of glass together forming a window. The display device is activated by a microchip or inverter and is connected to a power supply and the illuminate film by a wire to display many different messages utilizing any number of illuminated letters and numbers from inside the glass pieces. A non-limiting example includes the words "open" or "close" illuminating from the illuminate film within the window. A home or business can be found easier by ambulances, fire departments, patrol cars, cab drivers, repair persons and delivery persons, whom can depend on the illuminated window display both during the day and at night. Businesses can advertise using a variety of messages and phrases inside of the windows glass using the illuminated window display.

DESCRIPTION OF THE PREFERRED EMBODIMENT

Figure 1:
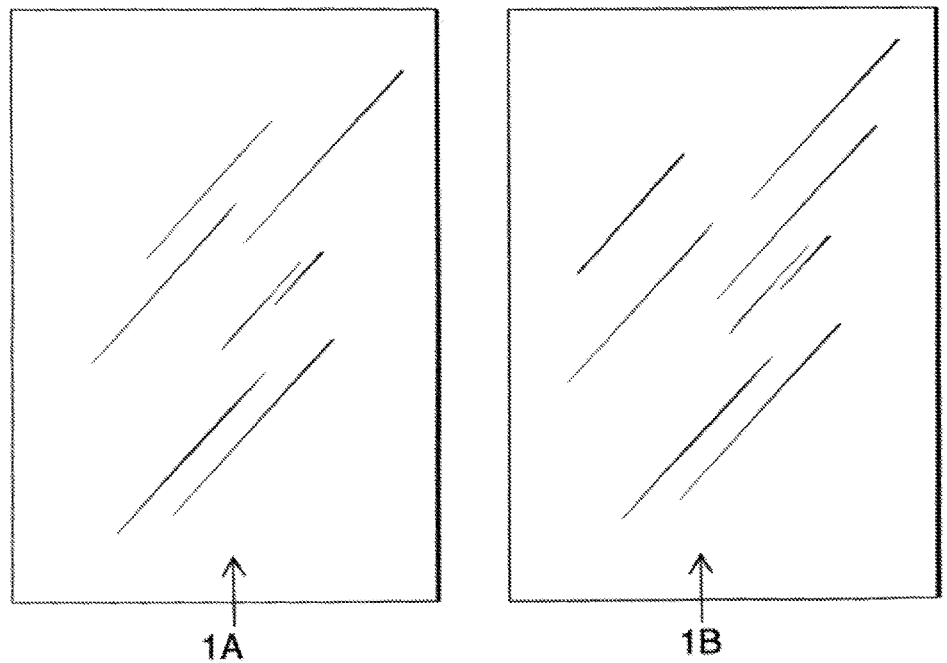
FIG. 1 is a front view showing two pieces of glass before being made into a window.
Figure 2:
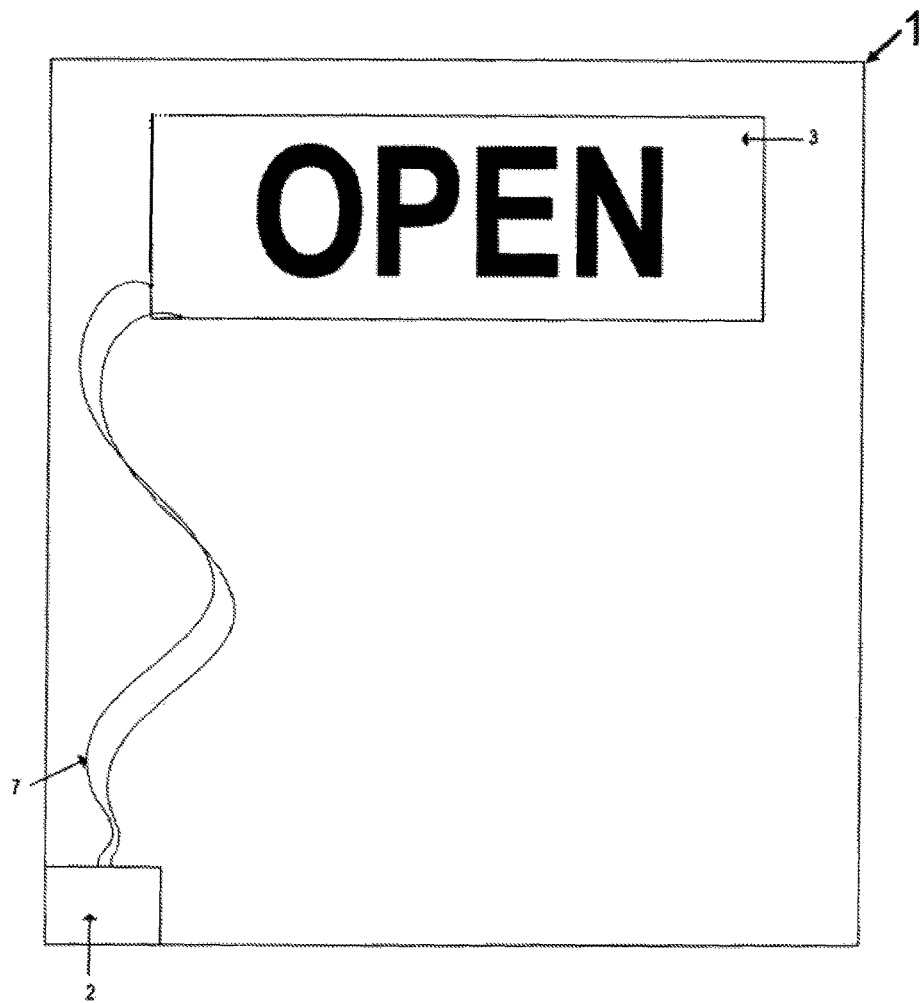
FIG. 2 is a front view of the present invention.
Figure 7:
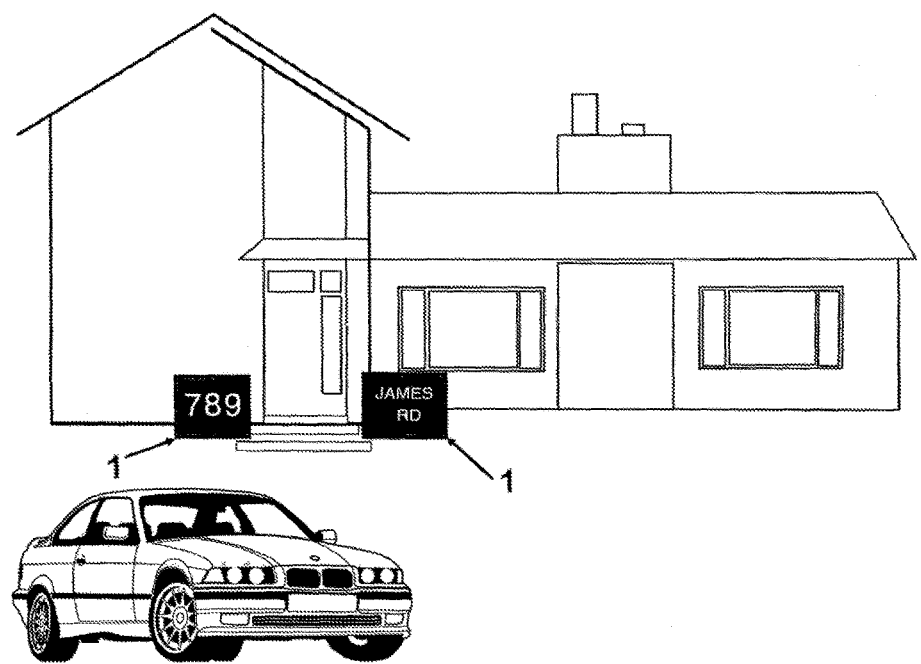
FIG. 7 is an illustrative view of the present invention installed adjacent to a house displaying house and street information.
Figure 8:
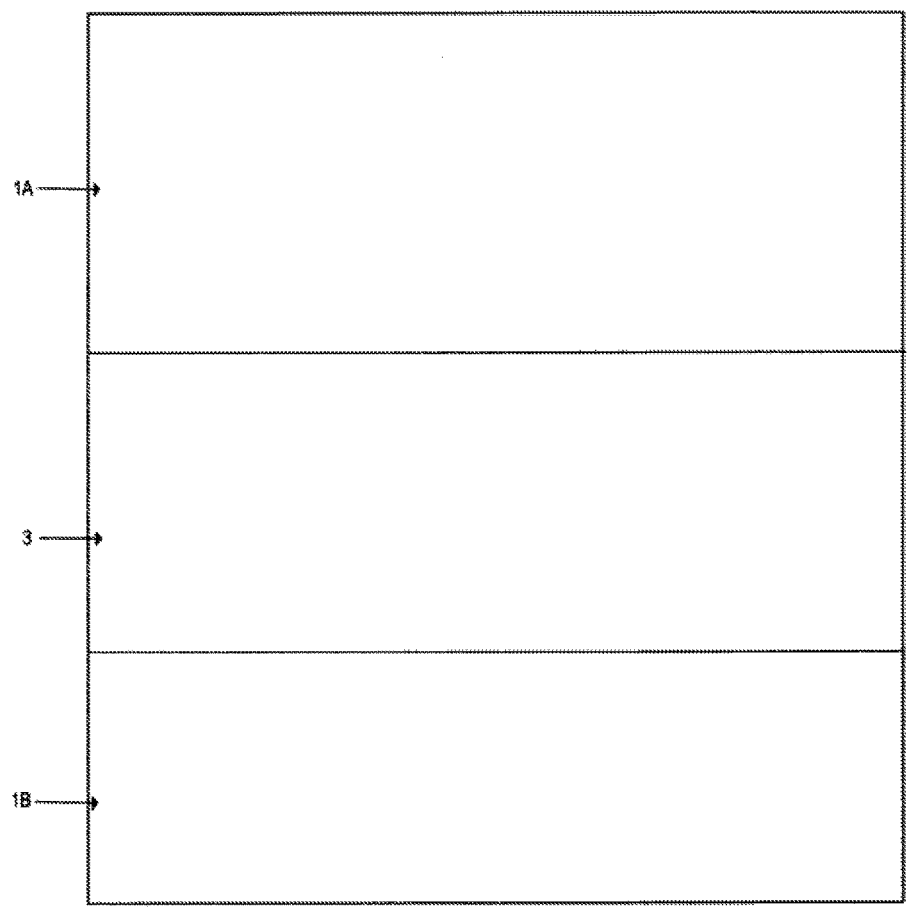
FIG. 8 is a side view of the present invention showing the illuminate film between the two pieces of glass.

As seen in FIGS. 1, 2, and 8, a window of the present invention 1 is formed by two pieces of glass, inner glass 1A and outer glass 1B. Disposed between the two glass pieces is a controller device 2 including a microchip or inverter, an illuminate film 3 including at least one of an EL, LED, OLED, and LC device, and a wiring connection 7 including at least one wire. The controller device 2, the illuminate film 3, and the wiring connection 7, are disposed between the inner glass 1A and the outer glass 1B forming the window, as illustrated in FIG. 8; the controller device 2 being electrically and physically connected to the illuminate film 3 through the wiring connection 7 to program at least one of letters and numbers to be illuminated by the illuminate film as illustrated in FIGS. 2 and 7.

Figure 3:
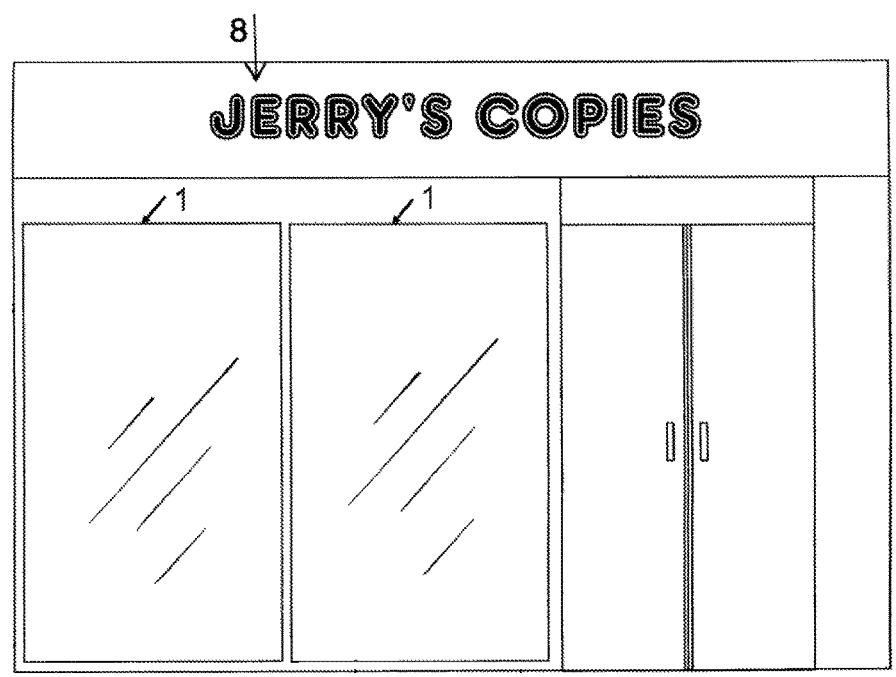
FIG. 3 is an illustrative view of the present invention installed as a storefront window.
Figure 4:
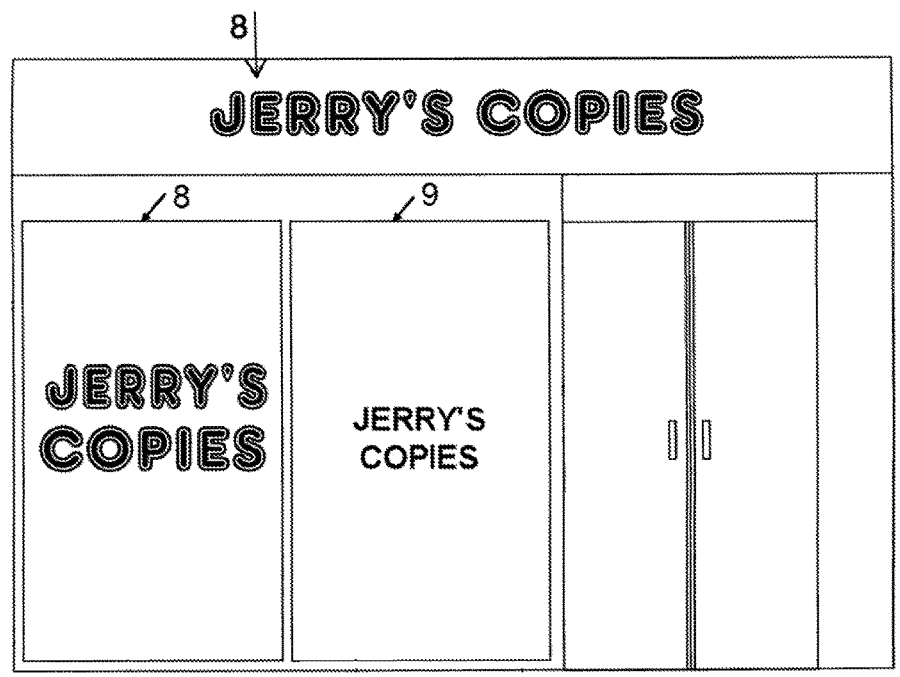
FIG. 4 is an illustrative view of conventional signage found on a storefront including neon gas tubing and paper signs.
Figure 5:
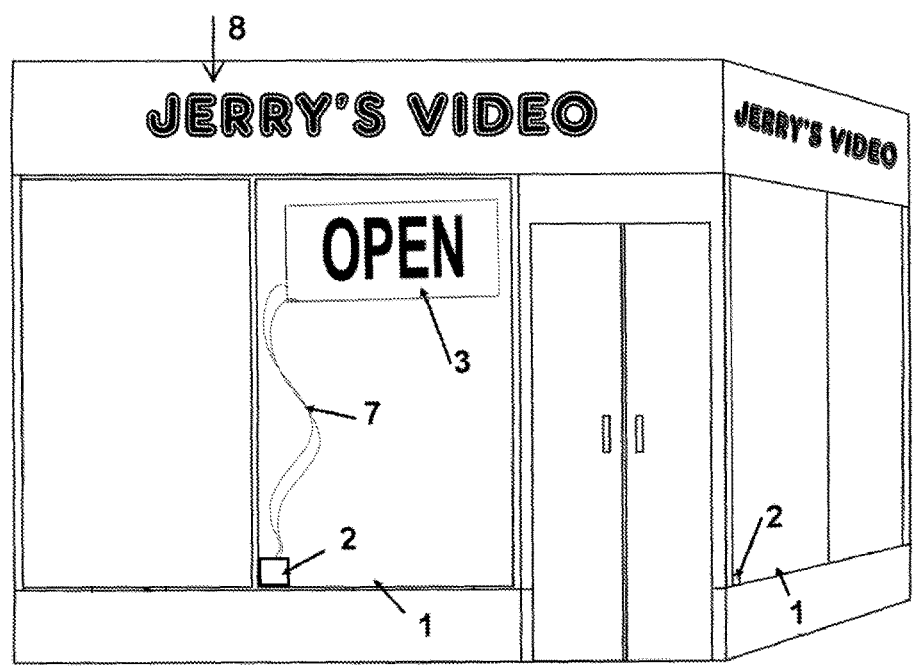
FIG. 5 is another illustrative view of the present invention installed as a storefront window.
Figure 6:
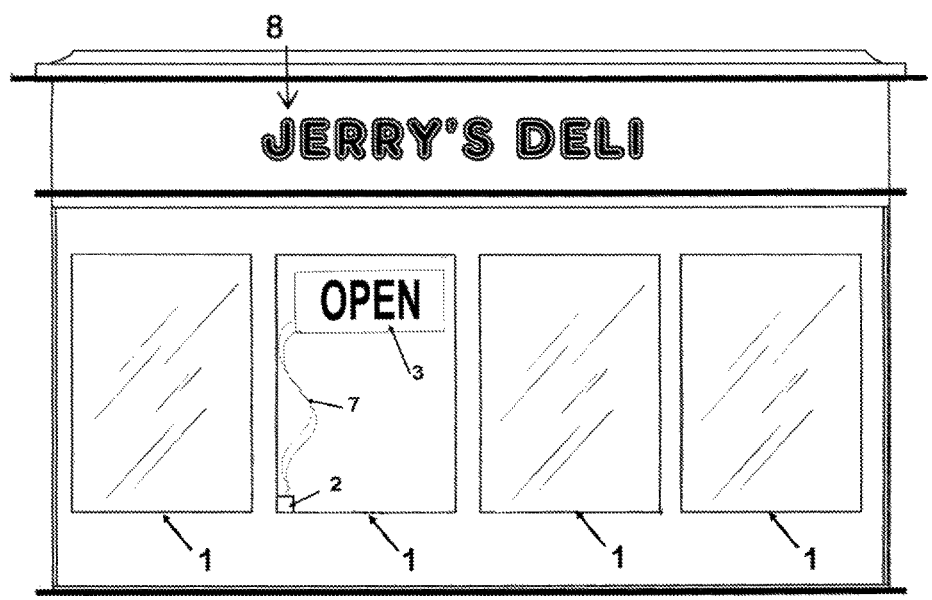
FIG. 6 is another illustrative view of the present invention installed as a storefront window.

As illustrated in FIGS. 3, 5, and 6, in an embodiment of the present invention, the illuminated window can be utilized as a window in a storefront. There is no limitation of what a business can advertise from the window of the present invention, as the present invention allows for the user to change the letters and numbers being displayed to provide for different phrases, information, and the like. For instance, a restaurant can display daily buffet specials. Likewise, as illustrated in FIG. 7, the illuminated window can be utilized as signage for a house to display house or street information. Such signage being selectively illuminated in order to display a home address when it may be hard to locate or see, such as at night.

As illustrated in FIGS. 3-6, the present invention is capable of being utilized both in conjunction with or instead of conventional neon glass tubing signage 8 and paper signage 9.

We claim:

1. An illuminated window comprising:
   two pieces of glass including an inner glass and an outer glass,
   a controller device comprising at least one of a microchip and an inverter,
   an illuminate film, and
   a wiring connection comprising at least one wire;
   wherein the controller device, the illuminate film, and the wiring connection are disposed between the two pieces of glass, forming the window; the controller device being electrically and physically connected to the illuminate film through the wiring connection to program at least one of letters and numbers to be illuminated by the illuminate film.

2. The illuminated window of claim 1, wherein the Illuminate film comprises at least one of an EL, LED, OLED, and LC device.

3. The illuminated window of claim 1, wherein the window is provided in association with any one or more of a building, a house, and a business.

* * * * *